March 21, 1950 H. L. HAUSLADEN 2,501,512
AUTOMOBILE HEATER
Filed March 24, 1948

INVENTOR.
HAROLD L. HAUSLADEN
BY Daniel V. O'Keeffe
ATTORNEY

Patented Mar. 21, 1950

2,501,512

UNITED STATES PATENT OFFICE 2,501,512

AUTOMOBILE HEATER

Harold L. Hausladen, Duluth, Minn.

Application March 24, 1948, Serial No. 16,651

7 Claims. (Cl. 237—12.3)

This invention relates to vehicle heaters and more particularly to vehicle heaters of the type adapted to warm the passenger compartment of a motor vehicle, such as an automobile and the like, by heating a portion of the fluid used in the cooling system of the engine of the vehicle and passing the heated fluid through a radiator positioned in heat exchange relation to the interior of the passenger compartment.

Automobile heaters having a radiator positioned in heat exchange relation to the passenger compartment of an automobile are, per se, relatively old in the art. However, in the past, the majority of such automobile heaters have been of the type commonly referred to as "hot-water heaters" wherein the coolant fluid of the vehicle engine was passed through the heater radiator, the temperature of the fluid passing through the heater radiator depending on the temperature to which the fluid in the cooling system was heated by the operation of the vehicle engine. Such heaters have had several inherent disadvantages, one of these disadvantages being that the heaters were slow-acting after the engine was first started, it being necessary for the fluid in the entire cooling system to warm to substantially normal operating temperature before any appreciable amount of heat was derived from the heater. Another disadvantage of such heaters has been that, because the effectiveness of the heater was dependent on the temperature of the fluid in the cooling system of the vehicle, in order to insure sufficient heat being supplied to the heater for passenger comfort it has been necessary to maintain the temperature of the coolant fluid in the engine at relatively high levels by various means such as, for example, by using thermostats in the cooling system, this practice, in many instances, resulting in maintaining the temperature of the coolant at a level above the preferred temperature for ideal engine operations.

A primary object of my invention is to overcome the aforementioned, and other, disadvantages of the "hot-water heaters" by providing a novel heater which, although it uses fluid from the cooling system of the vehicle in which it is embodied to afford the working fluid or heat transferring medium, heats the working fluid independently of the cooling system of the vehicle.

Another object of my invention is to enable a novel vehicle heater, of the type adapted to use fluid from the cooling system of the engine of the vehicle as the heat-transfer medium, to be constructed which is effective to efficiently provide heat for the passenger compartment of the vehicle relatively quickly after starting of the engine of the vehicle and irrespective of whether the temperature of the fluid in the engine-cooling system of the vehicle is high or low.

In my novel heater, a heat exchange unit is mounted in heat exchange relation to a portion of the exhaust duct, such as, for example, the exhaust manifold, of the engine of the vehicle to be heated and the working fluid used in the heater is passed through the heat exchange unit and is heated by the hot products of combustion which pass through the exhaust duct during normal operation of the engine and are effective to heat the exhaust duct to a relatively high temperature. Heaters of this general nature have been heretofore known in the art. However, such heaters heretofore known have had several inherent disadvantages such as, for example: being so constructed that they interfered with the flow of combustion products through the exhaust system of the engine of the vehicle being heated; requiring special pumps and the like for feeding fluid through the heater; requiring special auxiliary supplies of fluid; or, being complicated in construction, inefficient in operation and expensive to manufacture.

It is an object of my invention to enable a vehicle heater of the type which utilizes fluid taken from the cooling system of the vehicle engine and heated by the exhaust gases of the engine, to be constructed, and to operate in a novel and expeditious manner.

Another object of my invention is to enable a vehicle heater of the aforementioned type to be constructed which is relatively simple in construction, may be economically produced commercially and may be readily installed in a motor vehicle.

A further object of my invention is to so construct a vehicle heater of the aforementioned type that the working parts thereof may be relatively easily removed and replaced.

Yet another object of my invention is to construct a vehicle heater of the aforesaid type in a novel and expeditious manner whereby, during the operation thereof, it is enabled to produce a relatively large amount of heat.

Another object of my invention is to construct a vehicle heater of the aforementioned type wherein the flow of fluid therethrough is controlled in a novel and expeditious manner in accordance with the pressure and fluid level therein.

A further object of my invention is to so construct a novel heater of the aforementioned type which is effectively protected against dangerously high internal pressures and dangerously low internal pressures.

Another object of my invention is to provide a novel heater wherein working fluid is prevented from circulating therethrough until the temperature of the working fluid is sufficiently high to afford a good heat-transferring medium.

Another object of my invention is to construct a novel vehicle heater of the aforementioned type which, although using fluid from the cooling system of the engine of the vehicle to provide the working fluid of the heater, operates in a manner whereby the temperature of the main body of the coolant fluid in the cooling system is not raised appreciably and whereby the normal operation of the heater does not cause boiling off of the coolant fluid from the cooling system.

Other and further objects of the present invention will be apparent from the following description and claims and are illustrated in the accompanying drawing which, by way of illustration, shows a preferred embodiment and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 7 is a detail sectional view taken substantially on the line 7—7 in Fig. 2.

Figure 1:
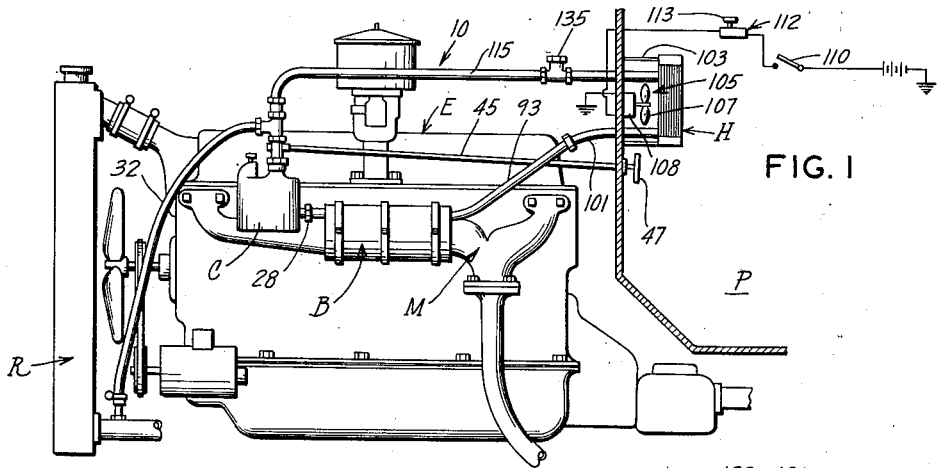
Fig. 1 is a side elevational view of the heater embodying the principles of my invention and and showing the heater in installed position in a motor vehicle, certain of the parts thereof being shown diagrammatically.
Figure 3:
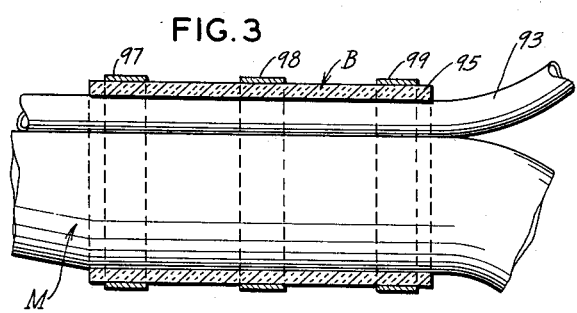
Fig. 3 is an enlarged detail sectional view of another portion of the heater shown in Fig. 1.

In the drawing, a heater 10 is shown to illustrate a preferred embodiment of my invention. The heater 10 comprises, in general, a heat-exchange unit or boiler B mounted on the exhaust manifold M of the engine E of a motor vehicle and having one end connected to the radiator R of the vehicle to receive coolant fluid therefrom. The other end of the boiler B is connected to one end of another heat exchange unit or radiator H mounted in the passenger compartment P of the motor vehicle, the other end of the radiator H being connected by a return connection to the radiator R.

Both the inlet connection of the boiler B to the radiator R and the return connection of the heater-radiator H to the radiator R are made through a control unit C which is operable in a novel and expeditious manner to control the circulation of working fluid through the heater 10. During the operation of my novel heater 10, as will be discussed in greater detail presently, coolant fluid flows from the radiator R into the boiler B where it is heated and passes into the radiator H to afford heat for the passenger compartment P.

The control unit C through which the boiler B is connected to the radiator R, includes a substantially T-shaped fitting 12. A manually operated shut-off valve or control valve 14 is connected to one arm of the fitting 12 by suitable means such as a collar 16, and a return valve 18 is similarly connected to the opposite arm of the fitting 12 by a collar 20.

An inlet valve 22 having a housing 24 is connected at one end to the control valve 14 by a collar 26 and is connected at the other end by a coupling member 28 to one end of the boiler B. Thus, it will be seen that the fitting 12, return valve 18, control valve 14 and inlet valve 22 form an integral unit comprising the control unit C.

The inlet 30 of the fitting 12 is connected by a suitable conduit such as a tube 32 to the lower end of the vehicle radiator R, this connection preferably being made on the pressure side of the water-pump in those vehicles employing water-pumps in their cooling systems. The tube 32 affords an inlet conduit through which coolant fluid from the radiator R may flow into the fitting 12, and, because the fluid level in the radiator R is above that in the fitting 12, the fluid thus fed to the fitting 12 is under a slight pressure irrespective of whether or not the vehicle in which my heater is embodied employs a water-pump.

Figure 2:
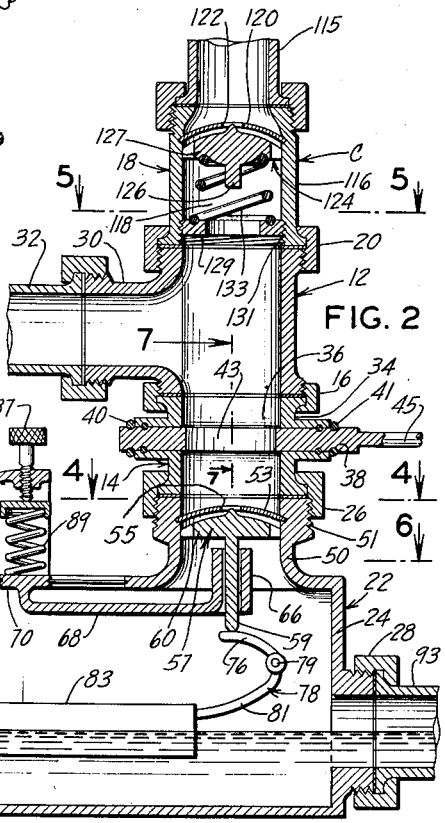
Fig. 2 is an enlarged detail sectional view of a portion of the heater shown in Fig. 1.

The shut-off valve 14 comprises the usual type of two-way valve having a housing 34 through which a passageway 36 extends. A plug member 38 extends transversely through the passageway 36 and is retained in the housing 34 by suitable means such as a pin 40 and a snap-ring 41. The plug member 38 is rotatably mounted in the housing 34 and has a slot 43 extending therethrough which, when the plug member 38 is positioned as shown in Fig. 2, affords a passageway through which fluid may flow from one end of the valve to the other. When the plug member 38 is rotated in the housing 34 to a position at right angles to that shown in Fig. 2, the slot 43 is moved out of communication with the end portions of the passageway 36 to thereby close the valve 14. Manual control of the valve 14 is afforded by a shaft or cable 45 having one end connected to the plug member 38 and the other end extending into the passenger compartment P of the vehicle and having a handle 47 mounted thereon, whereby the occupant of the passenger compartment by manipulating the handle 47 may adjust the setting of the valve 14.

Figure 4:
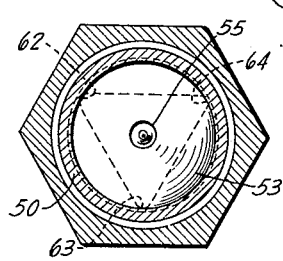
Fig. 4 is a sectional view taken substantially on the line 4—4 in Fig. 2.
Figure 5:
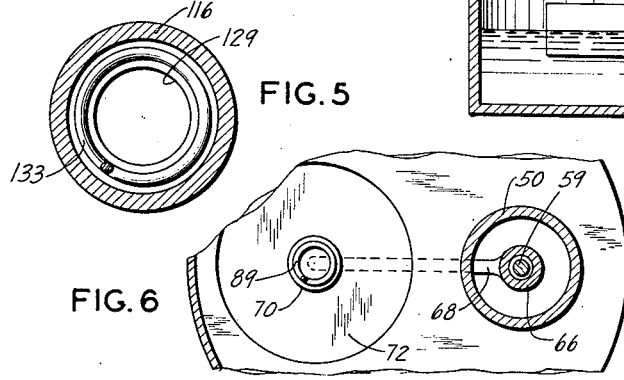
Fig. 5 is a sectional view taken substantially on the line 5—5 in Fig. 2.
Figure 6:
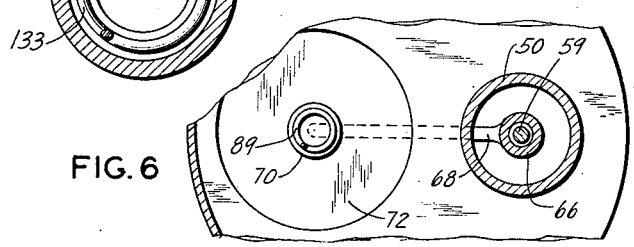
Fig. 6 is a sectional view taken substantially on the line 6—6 in Fig. 2.

The housing 24 of the inlet valve 22 has a nipple 50 projecting therefrom which affords the connecting member to which the collar 26 is attached, suitable threads 51 being formed on the outer surface of the nipple 50 for this purpose. A circular shaped valve seat 53, having a central opening 55 formed therein, Fig. 2, is mounted in the nipple 50 and affords a seat for a valve member 57. The valve member 57 comprises an elongated shaft 59 having a substantially triangular shaped head 60 formed thereon. The lobes 62, 63 and 64, Fig. 4, of the valve head 60 engage the inner wall of the nipple 50 and afford guide members for valve member 57.

The valve stem 59 extends through a boss 66 formed on one end of an arm 68, the other end 70 of the arm 68 being attached to the center portion of a diaphragm 72 mounted in one wall 74 of the housing 24. The end of the valve stem 59 opposite the end to which the valve head 60 is attached, is engaged with one arm 76 of a bell crank lever 78, the bell crank lever 78 being pivotally mounted in the housing 24 by a pin 79 projecting inwardly from one wall of the housing 24. The other arm 81 of the bell crank lever 78 is connected to a float 83 mounted in the housing 24 for a purpose which will be explained in greater detail hereinafter.

A bracket arm 85 extends outwardly from the housing 24 of the inlet-valve 22 and has one end extending over the central portion of the diaphragm 72. A bolt 87 extends through a tapped opening formed in the free end of the arm 85 and is operable to be moved toward and away from the diaphragm 72. A compression spring 89 is mounted between the arm 85 and the diaphragm 72 with one end engaged with the end 70 of the arm 68 and the other end mounted in a cap member 91 engaged by the bolt 87. The bolt 87 affords effective means for adjusting the compression of the spring 89 and thereby affords means for readily adjusting the inward force of the spring 89 on the diaphragm 72.

The boiler B comprises a tube 93, formed of any suitable material such as copper, which is mounted on, and extends along, the manifold M of the engine E. A sheet of suitable insulating material, such as asbestos, is mounted on the tube 93 and the manifold M to form a cover 95 therefor. Three bands 97, 98 and 99, formed of a suitable material such as steel, are mounted on the cover 95 and are effective to hold the tube 93 in tight contact with the manifold M to thereby insure good heat exchange relationship therebetween.

The end of the tube 93 opposite that to which the inlet valve 22 is attached is connected by a suitable coupling member 101 to the inlet of the heater-radiator H. The radiator H may be of the conventional automobile-heater type and is mounted in the passenger compartment P by a suitable bracket 103 attached to the front wall of the compartment. A blower unit 105 comprising the conventional fan 107 and motor 108 is mounted between the radiator H and the front wall of the compartment P and is adapted to blow air across and through the tubes of the radiator H during the operation of the heater 10. Suitable controls such as a manually operable switch 110 and a thermostatically controlled switch 112, responsive to the temperature of the air in the passenger compartment P and having a control button 113 for effecting manual adjustment, may be mounted in the passenger compartment P for controlling the operation of the motor 108 and thereby controlling the operation of the blower 105.

The outlet end of the radiator H is connected by a suitable conduit or tube 115 to the inlet end of the return-valve 18. The return valve 18 comprises an elongated housing 116 having a passageway 118 extending therethrough. A valve seat 120, Fig. 2, similar to the valve seat 53, and having a central opening 122 formed therein is mounted in the passageway 118 and affords a seat for a valve member 124. The valve member 124 comprises a stem 126 having a head 127 mounted on one end thereof, the head 127, like the head 60 of the valve member 57, being substantially triangular in shape and having three lobes engageable with the interior of the housing 118 to afford a guide for the valve member 124.

An annular-shaped spring-seat 129 having threads formed on the outer peripheral edge portion thereof is adjustably mounted in the passageway 118, the threads on the outer surface of the spring-seat 129 being engaged with complementary threads 131 formed on the inner surface of the housing 116. A compression coil spring 133 is mounted between the valve head 127 and the spring seat 129 and is normally effective to yieldingly hold the valve member 124 in engagement with the valve seat 120 to thereby close the valve 18. Thus it will be seen that the valve 18 affords an effective one-way valve which is operable to automatically prevent the flow of fluid therethrough from the tube 32 to the tube 115, but is operable to automatically open, when the pressure in the tube 115 becomes high enough to overcome the spring 133 and force the valve member 124 downwardly away from the valve seat 120, to thereby permit the return flow of fluid from the tube 115 into the tube 32 and then into the cooling system of the engine E.

Another one-way valve 135, which may be identical to the return valve 18 in the control unit C, is mounted on the conduit 115 connected between the radiator H and the return valve 18. This valve 135 is mounted on the conduit 115 with the outlet side thereof connected to the conduit 115 and the inlet side in communication with the atmosphere. Thus it will be seen that when the pressure in the conduit 115 is equal to, or greater than, the atmospheric pressure the valve 135 will be closed to thereby prevent the flow of fluid therethrough. However, it will also be seen that if the pressure in the conduit 115 drops below atmospheric pressure a predetermined amount, as determined by the adjustment of the spring in the valve 135, the valve 135 will be caused to open and permit air to pass into the conduit 115 to thereby prevent the pressure in the tube 115 from dropping to a sufficiently low level that the tube, or other parts of the heater 10, are caused to collapse.

It has been found that when it is desired to shut off my novel heater, closing of the valve 14 and opening of the switch 110, thereby shutting off the supply of fluid from the radiator R to the boiler B and stopping the blower unit 105, is effective to do so in a practical manner.

*Operation*

At the initiation of a typical operation of my novel heater, when the passengers first enter the compartment P of the vehicle in which the heater is installed, the valve 14 will normally be closed so that little or no coolant fluid will be present in the boiler B, and the engine E and, therefore, the boiler B will be cold so that the pressure in the housing 24 will not be sufficient to flex the diaphragm 72 outwardly. Thus, the valve 57 will normally be open at this time.

After the passengers are in the compartment P, the engine E is normally started and the handle 47 then turned to open the valve 14. Coolant fluid may then flow from the radiator R through the conduit 32, the fitting 12, the control valve 14, and the valve seat 53 into the housing 24 and the boiler tube 93. As the level of the fluid rises in the housing 24 and the boiler B, the float 83 is raised thereby and causes the bell-crank 78 to pivot on the pin 79 in a clockwise direction, as viewed in Fig. 2. Rotation of the bell-crank in a clockwise direction causes the arm 76 to swing upwardly to thereby move the valve member 57 toward the valve seat 53. When the fluid level in the boiler B and the housing 24 has raised to a predetermined level the float 83 and bell crank 78 are effective to seat the valve 57 on the seat 53 and thereby close the nipple 50 against further flow of fluid therethrough into the housing 24.

The level of the fluid in the boiler tube 93 when the valve 57 is closed by the float 83, is preferably such that a relatively thin layer of fluid is present in the boiler B so that the fluid in the boiler B may be quickly and easily heated and also so that ample space is insured for the relatively free passage of vapor through the tube 93. Thus, for example, it is desirable, when using a tube 93 having an inside diameter of one-half an inch, to so construct and arrange the control unit C that the float 83 will cause the valve 57 to close when the tube 93 is approximately half full.

The exhaust manifold M of the customary engine E is heated by the exhaust gases passing therethrough to a relatively high temperature within a short time after starting of the engine. As previously stated, the tube 93 is maintained in good heat-exchange relationship with the manifold M by the bands 97, 98 and 99 and is protected from the cooling effects of the outside atmosphere by the insulating cover 95 so that it too is relatively quickly heated and is effective to cause vaporization of fluid in the boiler B within a relatively short time after the engine E is started.

The vapor or steam generated in the boiler B is prevented from flowing back through the housing 24 into the radiator R by the inlet valve 57 which is effective as a one-way valve. As a result, the vapor pressure increases in the boiler B and the housing 24 and causes vapor to flow through the tube 101 into the heater-radiator H to thereby heat the latter. After the radiator H has been warmed the switch 110 may be manually closed to thereby energize the motor 108 and drive the fan 107 to blow air across and through the radiator into the passenger compartment P in the usual manner. This flow of air across and through the radiator H, of course, causes the air to be heated and thereby heats the passenger compartment P of the vehicle. In addition, the loss of heat from the vapor in the radiator H to the air circulating around the latter normally causes condensation of a substantial portion of the vapor in the radiator H, which condensate flows back through the tube 101 into the boiler B where it is reheated and again vaporized.

During initial operation of the heater 10, the pressure in the boiler B and the housing 24 does not become high enough to flex the diaphragm 72 outwardly sufficiently to cause the arm 68 to actuate the valve 57 and, therefore, the opening and closing of the valve 57 is controlled by the float 83, the float 83 dropping and permitting the valve 57 to open and thereby permit more fluid to flow into the boiler B when the fluid level in the boiler B drops below the aforementioned predetermined level, and the float 83 raising to thereby positively close the valve 57 when the fluid level in the boiler is at or above the aforesaid predetermined level. However, after normal operation of the heater 10 is attained, the pressure in the boiler B and the housing 24 increases above a predetermined pressure, as determined by the adjustment of the spring 89, and the diaphragm 72 is flexed outwardly thereby and causes the boss 66 on the arm 68 to move into engagement with the head 60 on the valve member 57 to thereby positively hold the valve 57 in closing engagement with the seat 53 to prevent the further flow of fluid into the housing 24 and the boiler B while this high-pressure condition prevails. The spring 133 in the return valve 18 is so adjusted that it is effective to hold the valve 124 in closed position against the pressure normally developed in the heater 10. Thus it will be seen that after normal operation of my novel heater is attained it comprises a substantially closed unit, the amount of fluid therein and the amount of heat being applied thereto being in such balance that substantially a state of equilibrium exists, the pressure in the heater 10 being sufficient to cause the diaphragm 72 to maintain the inlet valve 57 in closed position but being insufficient to cause the return valve 18 to open. When this state of equilibrium exists it will be seen that a relatively great amount of heat is supplied to the heater radiator H, the vapor being heated to a relatively high temperature.

If during operation of my novel heater, the pressure therein becomes greater than a predetermined amount, as determined by the adjustment of the spring 113 in the return valve 18, the valve member 124 is moved thereby into open position relative to the valve seat 120 to thereby relieve the pressure therein by permitting return flow of fluid from the tube 115 of the heater 10 into the radiator R of the vehicle cooling system. This return flow of fluid into the cooling system of the vehicle is so slight during normal operation of my heater that it is readily absorbed by the larger mass of fluid in the cooling system without loss in the form of vapor and without raising the temperature of the coolant to any appreciable extent.

The spring 89 controlling the movement of the diaphragm 72, and the spring 133 of the return valve 18 are so adjusted that the relative strengths thereof are such that the valve 57 will be closed by the arm 68 at a lower pressure in the heater 10 than the pressure at which the valve 18 will open.

If during the operation of the heater 10, the pressure falls below the pressure required to distend the diaphragm to valve closing position, the arm 66 moves inwardly away from the valve head 60 and thereby frees the valve 57 to the control of the float 83 so that the valve 57 will again be opened and closed in accordance with the fluid level in the boiler B and housing H as previously discussed.

Thus it will be seen that the diaphragm 72, the float 83, the valve 57 and the return valve 124 cooperate with each other in maintaining the proper pressure and fluid level in the heater 10.

In some instances, such as, for example, after the heater 10 has been operated at high heat output, during which a relatively large amount of fluid and vapor is present therein, if the engine E were shut off and allowed to cool the vapor present in the heater 10 would be caused to condense, thereby creating a partial vacuum therein. In some instances, if this vacuum were uncontrolled the difference in pressure between the interior of the heater 10 and the outside atmosphere might be sufficient to cause collapse or other serious damage to the radiator H, the boiler B or other parts of the heater 10. However, with the valve 135 embodied in my novel heater, this danger is eliminated, the valve 135 being operable to open when the pressure in the heater 10 decreases below a predetermined pressure and thereby vent the heater to the atmosphere.

From the foregoing it will be seen that I have provided a novel vehicle heater which is quickly operable after the engine of the vehicle to be heated is started.

Also, it will be seen that although my heater utilizes the waste heat of the exhaust gases to heat working fluid, comprising a portion of the coolant fluid of the engine of the vehicle, to a relatively high temperature, this is accomplished in a novel and expeditious manner whereby no interference is caused to the flow of exhaust gases and also whereby no appreciable loss of coolant fluid from the cooling system results.

Furthermore, it will be seen that the operation of my novel heater during a heating operation is effectively controlled by cooperating pressure sensitive and fluid-level sensitive means which are constructed and operate in a novel and expeditious manner.

In addition it will be seen that I have provided a novel heater which is efficient in operation; may be readily and economically produced commercially; may be quickly and easily installed in a motor vehicle; and wherein the working parts may be quickly and easily removed and replaced if it is desired to do so.

Hence, while I have illustrated and described the preferred embodiment of my invention, it is to be understood that this is capable of variation and modification and I, therefore, do not wish to be limited to the precise details set forth, but desire to avail myself of such changes and alterations as fall within the purview of the following claims.

I claim:

1. An automobile heater for use in an automobile having an internal combustion engine including an exhaust duct for discharging products of combustion and a cooling system using fluid as a cooling means, said heater comprising a heat exchange unit adapted to be mounted in heat exchange relationship on such an exhaust duct, conduit means adapted to be connected to such a cooling system and said heat exchange unit for feeding such fluid from said cooling system to said heat exchange unit to afford working fluid for said heater, valve means for controlling the flow of said fluid through said conduit means into said heat exchange unit in accordance with the quantity of fluid present in said heat exchange unit, said valve means being adapted to automatically close to thereby prevent the passage of fluid through said conduit means into said heat exchange means when the quantity of fluid in said heat exchange means is more than a predetermined quantity, a radiator adapted to be mounted in operative position in said automobile, means for feeding working fluid from said heat exchange unit into said radiator, and means for feeding working fluid from said radiator to said cooling system.

2. An automobile heater for use in an automobile having an internal combustion engine including an exhaust duct for discharging products of combustion and a cooling system using fluid as the cooling means, said heater comprising a heat exchange unit adapted to be mounted on said engine in heat exchange relationship with such an exhaust duct, conduit means for feeding such fluid from such a cooling system to said heat exchange unit, a valve connected to said conduit means and operable to be opened and closed to thereby control the flow of fluid through said conduit means into said heat exchange unit and thereby control the pressure in said heat exchange unit, control means connected to said valve and effective to control the opening and closing of the latter, said control means including a float responsive to the level of fluid in said heat exchange unit and a diaphragm responsive to the pressure in said heat exchange unit, a radiator, conduit means for feeding working fluid from said heat exchange unit into said radiator, and conduit means for feeding working fluid from said radiator to said cooling system.

3. In an automobile heater for use in an automobile having an internal combustion engine including an exhaust duct for discharging products of combustion and a cooling system using fluid as the cooling means, and a radiator in the passenger compartment, a heat exchange unit adapted to be connected to said radiator and mounted on said exhaust duct in heat exchange relation thereto, an elongated duct adapted to be operatively connected between such a cooling system and said heat exchange unit for feeding such fluid from said cooling system into said heat exchange unit, a second elongated duct adapted to be connected between said radiator and said cooling system for feeding working fluid from said radiator to said cooling system, a valve in said first mentioned elongated duct and operable to be opened and closed to thereby control the flow of fluid through the latter into said heat exchange unit, means operable by the fluid in said heat exchange unit for controlling the opening and closing of said valve, and a second valve in said second elongated duct and operable to be opened and closed to thereby control the flow of working fluid from said radiator through said second duct into said cooling system, said second valve being responsive to pressure in said second duct and being adapted to open when the pressure in said second duct is above a predetermined pressure and being adapted to close when the pressure in said second duct is below said predetermined pressure.

4. An automobile heater for use in an automobile having an internal combustion engine including an exhaust duct for discharging products of combustion and a cooling system using fluid as the cooling means, said heater comprising a heat exchange unit adapted to be mounted on said exhaust duct in heat exchange relation thereto, an elongated duct adapted to be operatively connected between such a cooling system and said heat exchange unit for feeding such fluid from said cooling system into said heat exchange unit to afford working fluid for said heater, a radiator connected to said heat exchange unit for receiving working fluid therefrom, a second elongated duct adapted to be connected between said radiator and said cooling system for feeding working fluid from said radiator to said cooling system, a valve in said first mentioned elongated duct and operable to be opened and closed to thereby control the flow of fluid through the latter into said heat exchange unit, means operable by the fluid in said heat exchange unit for controlling the opening and closing of said valve, and a second valve in said second elongated duct and operable to be opened and closed to thereby control the flow of working fluid from said radiator through said second duct into said cooling system, said second valve being responsive to pressure in said second duct and being adapted to open when the pressure in said second duct is above a predetermined pressure and being adapted to close when the pressure in said second duct is below said predetermined pressure, and means for automatically venting said second duct to the atmosphere when the pressure in said second duct is below a predetermined pressure.

5. An automobile heater for use on an automobile of the type having a fluid-cooled internal combustion engine, said heater comprising a boiler adapted to be mounted in heat exchange relation on an exhaust duct of such an engine for receiving heat from said exhaust duct during operation of said engine, means including insulating material for holding said boiler in such position relative to said exhaust duct, an inlet conduit adapted to be connected to said boiler and to the cooling system of said engine for feeding such fluid from said engine into said boiler, said boiler being effective to heat said fluid fed thereinto during normal operation of said engine, a heat exchange unit adapted to be mounted in heat exchange relationship with the interior of the passenger compartment of the automobile, conduit means for feeding fluid from said boiler into said heat exchange unit for heating the latter, an outlet conduit adapted to be connected between said heat exchange unit and said cooling system for feeding fluid from said heat exchange unit into said cooling system, valve means mounted in said inlet conduit and responsive to the level of fluid and to the pressure in said boiler for controlling the flow of fluid through said inlet conduit into said boiler, said valve means being responsive to fluid levels above a predetermined level in said boiler and to pressures above a predetermined pressure in said boiler to close said intake conduit and thereby prevent the passage of fluid through said intake conduit from said cooling system to said boiler, and a check valve operatively mounted in said outlet conduit, said check valve being operable to permit the passage of fluid through said outlet conduit from said heat exchange unit to said cooling system and to prevent the reverse flow therethrough.

6. An automobile heater for use on an automobile of the type powered by an internal combustion engine having a cooling system using fluid as the cooling means, said heater comprising an elongated tube adapted to be mounted on the exhaust manifold of such an engine in heat exchange relation therewith, means for holding said tube in said relation to said manifold, an inlet conduit adapted to be connected to said tube and to such a cooling system of said engine for feeding fluid from said cooling system into said tube, said tube being effective to heat said liquid fed thereinto during normal operation of said engine, said conduit including a control unit for controlling the flow of fluid therethrough into said tube, said control unit comprising a one-way valve operable to be opened and closed to thereby open and close said conduit, and means responsive to the fluid level and pressure in said tube for controlling the opening and closing of said valve, a radiator adapted to be mounted in the passenger compartment of such an automobile in heat exchange relationship with the interior thereof, means for feeding fluid from said tube into said radiator, and means for feeding fluid from said radiator into said cooling system of said engine.

7. In an automobile including a passenger compartment, an internal combustion engine having a cooling system using fluid as the cooling means, and an exhaust duct for discharging hot combustion products from said engine, a radiator mounted in said compartment in heat exchange relation with the interior thereof, means including a boiler for feeding hot working fluid to said radiator, said boiler being mounted on said exhaust duct in heat exchange relation therewith for heating by such combustion products during an operation of said engine, conduit means connected to said cooling system and said boiler for feeding such fluid from said cooling system to said boiler, other conduit means connected to said radiator and said cooling system for feeding working fluid from said radiator to said cooling system, valve means for venting said other conduit means to atmosphere when the pressure therein is below a predetermined pressure, said valve means being operative to close when the pressure in said other conduit means is above said predetermined pressure, and means for controlling the flow of working fluid through said radiator, said last named means comprising valves mounted in said first mentioned conduit means and said other conduit means and responsive to pressure therein to effect opening and closing of said first mentioned and said other conduit means, said valve in said first mentioned conduit means being responsive to the fluid level in said boiler and being effective when the fluid level therein is above a predetermined level to close said first mentioned conduit means.

HAROLD L. HAUSLADEN.

REFERENCES CITED

The following references are of record in the file of this patent:

UNITED STATES PATENTS

| Number | Name | Date |
|---|---|---|
| 1,162,807 | Riley | Dec. 7, 1915 |
| 1,765,933 | Miller | June 24, 1930 |
| 1,928,127 | Fritz et al. | Sept. 26, 1933 |
| 2,018,339 | Angstman | Oct. 22, 1935 |
| 2,057,128 | Angstman | Oct. 13, 1936 |
| 2,076,287 | Arnold | Apr. 6, 1937 |